(12) United States Patent
Ozaki

(10) Patent No.: US 7,965,319 B2
(45) Date of Patent: Jun. 21, 2011

(54) IMAGE SIGNAL PROCESSING SYSTEM

(75) Inventor: Nozomu Ozaki, Kanagawa (JP)

(73) Assignee: Sony Taiwan Limited, Taipei (TW)

( * ) Notice: Subject to any disclaimer, the term of this patent is extended or adjusted under 35 U.S.C. 154(b) by 798 days.

(21) Appl. No.: 11/315,459

(22) Filed: Dec. 22, 2005

(65) Prior Publication Data
US 2006/0140500 A1  Jun. 29, 2006

(30) Foreign Application Priority Data

Dec. 24, 2004  (TW) ................................ 93140600 A

(51) Int. Cl.
*H04N 5/235* (2006.01)
*H04N 5/228* (2006.01)
*H04N 9/73* (2006.01)

(52) U.S. Cl. ............... 348/222.1; 348/221.1; 348/223.1; 348/224.1; 348/229.1

(58) Field of Classification Search ............... 348/221.1, 348/222.1, 223.1, 224.1, 229.1, 255, 251, 348/252, 254, 221, 241
See application file for complete search history.

(56) References Cited

U.S. PATENT DOCUMENTS
| | | | |
|---|---|---|---|
| 2002/0135683 A1* | 9/2002 | Tamama et al. | 348/222 |
| 2003/0095197 A1* | 5/2003 | Wheeler et al. | 348/241 |
| 2005/0010914 A1* | 1/2005 | Liang et al. | 717/168 |

\* cited by examiner

*Primary Examiner* — Sinh Tran
*Assistant Examiner* — Selam Gebriel
(74) *Attorney, Agent, or Firm* — Frommer Lawrence & Haug LLP; William S. Frommer; Thomas F. Presson

(57) ABSTRACT

An image signal processing apparatus that includes a data path portion for processing a raw image signal and merging and concentrating with non-linear filtering portion. The apparatus also includes a color space transformation portion, geometry transformation portion, linear filtering portion and gain adjustment portion to output a processed signal. The apparatus also includes control and judgment portion for receiving the raw image and the processed signal from the data path portion and generating a plurality of adjustment signals for the non-linear filtering portion.

7 Claims, 4 Drawing Sheets

IMAGE SIGNAL PROCESSING SYSTEM

BACKGROUND OF THE INVENTION

1. Field of the Invention

The present invention relates to an image processing system, and, in particular, to an image processing system which is suitable to be realized as a digital signal processor (DSP) for cameras as to provide a flexible data path which support a plurality of digital image processing, such as automatic white balance (AWB), automatic exposure (AE), blemish compensation, gamma correction, etc.

2. Related Background Art

There are various types of configurations to realize a camera system. The configurations may be depended upon the selection of processes, the sequence of the processes, color space, the components to be processed, and other optional functions. Furthermore, the camera system may be implemented in various ways. FIG. 4 shows a block diagram of a conventional camera system. The configuration shown in FIG. 4 is merely a single example of process function and sequence for the explanation of the conventional image processing.

In FIG. 4, signal flow of the camera system is generally classified into two categories: data path for signal processing; and non-data path for controlling. The data path of the conventional camera processing system is generally combined or blended with control functions. Each of the data paths are respectively controlled by a local control block such that the whole camera system is formed by the concatenation of said plurality of local control blocks. There is no strong relation or coordination among these local control blocks. This is due to the conventional camera system is designed based on the previous generation camera integrated circuits (ICs) formed by analog bipolar ICs. These camera ICs are built by the concatenation of analog local control blocks. Additionally, these local control blocks facilitate the understanding of the processes of each functional block and the design of each independent functional block.

The camera system shown in FIG. 4 comprises a blemish compensation block 61 for executing blemish compensation with a defective location data 62 to an original data from an image sensor (not shown), a shading compensation block 63 for executing the shading compensation with a shading table data 64 to the data from the blemish compensation block 61, and a transformation block 65 for transforming the data from shading compensation block 63 into red, green and blue (RGB) or color difference signals (Cb and Cr) and a luminance signal (Y) color data. The following processes are operated on these color spaces.

The camera system further comprises a noise reduction block 66 for suppressing the noises caused by image sensor or AD converter etc. by using a linear or non-linear filter such as Median filter, an edge enhancement block 67 for executing edge enhancement (or aperture compensation); an automatic exposure (AE) block 68 for controlling the gain of each color component as to adjust brightness; an exposure measurement block 70 for receiving an output signal of the edge enhancement block 67 via line 69 and outputting a signal to said AE block 68 through line 72. The output signal of the exposure measurement block 70 is further transmitted to an Iris/shutter control block 71 which outputs a signal 73 to a sensor module (not shown) for iris actuator and shutter speed control.

In FIG. 4, an automatic white balance (AWB) block 74 receiving an output signal from the AE block 68 is provided for performing white balance adjustment in accordance with a measurement of color characteristics of the present picture. A color estimation block 86 is provided within the AWB block 74 for performing the measurement of the color characteristics. In this AWB block 74, a suitable color temperature is selected based on a result from the color estimation block 86. Additional judging portion may be incorporated to improve the adaptability to various scenes, but this will make AWB block complicated.

The output signal of the AE block 68 is further delivered to an automatic focusing (AF) extraction block 76 via line 75 and subjected to high frequency analysis for focus control by a high-pass filter or Fourier transform portion. The AF extraction block 76 outputs a signal to an AF control block 77 for generating a control signal 78 to lens module (not shown).

The AWB block 74 outputs a signal that is subjected to gamma correction by gamma compensation block 79 with a gamma table 80 which decides characteristics of gamma compensation. As an option, a special effect block 81 is used to perform some special effect. The special effect block 81 then outputs a signal to a gain compensation block 82 for outputting a signal as a result 83 of camera system to be output to a next stage.

The camera system further includes a system controller 84 realized by central processing unit/digital signal processor (CPU/DSP) for performing the controlling of whole system including initial setting and the transition mode of the system. Some measurement and judgment may be performed at this system controller 84.

Alternatively, all of said mentioned camera processes may be effected by software programs for a more flexible configuration. But, each process in the software programs is almost the same as the conventional hardware camera system which is realized as a concatenation of smaller routine of processes each corresponding to a process realized in the conventional camera system.

However, the prior-art technique described above has the following disadvantages:

1. As each of these function blocks are executed by an independent block having a local control function, such system requires a concatenation of these independent blocks. The required hardware resource is thus increased and the construction of the camera system as a whole is rather complicated.

2. As the conventional architecture is formed with local control functions, it is difficult to use a more powerful CPU/DSP to control the sequences therefor. Each of the local control functions is realized by dedicated hardware predetermined during system development, it is impossible to update the system with a new powerful algorithm after then.

3. Since the blocks for automatically effecting the focusing, exposure adjustment, white balance adjustment, etc. are tightly coupled by the system controller 84, it is impossible to use a more powerful CPU which is provided inside of the system or outside of the system as a backend application processor. This makes the system too rigid to flexibly design to comply with the individual need of each camera system.

SUMMARY OF THE INVENTION

The present invention has been made with a view toward solving the problems mentioned above. It is a first object of the present invention to provide a sophisticated image processing apparatus with flexible and concentrated data path hardware to merge data paths for simplifying the function blocks in the apparatus and reducing the number of the data paths, thereby simplifying the construction of the controller and improving the reliability of the image sensing apparatus.

Additionally, as the control blocks are shifted to outside of the image processing apparatus, the hardware size of the image processing apparatus is decreased. This also renders the system adaptive to a higher-level control by utilizing a more powerful CPU. With this powerful CPU, it is possible to make this system to realize a more sophisticated algorithm for controlling an image processing operation.

To achieve these objects, there is disclosed in accordance with a preferred embodiment of the present invention, an image signal processing apparatus comprising:

data path portion for processing image signal, merged and concentrated with non-linear filtering portion, color space transformation portion, geometry transformation portion, linear filtering portion and gain adjustment portion for processing an raw image signal to output a processed signal; and control and judgment portion for receiving the raw image and the processed signal from said data path portion; generating a plurality of adjustment signal for the non-linear filtering portion, color space transformation portion, geometry transformation portion, linear filtering portion and gain controlling portion of said data path portion.

DETAILED DESCRIPTION OF THE PREFERRED EMBODIMENTS

Figure 1:
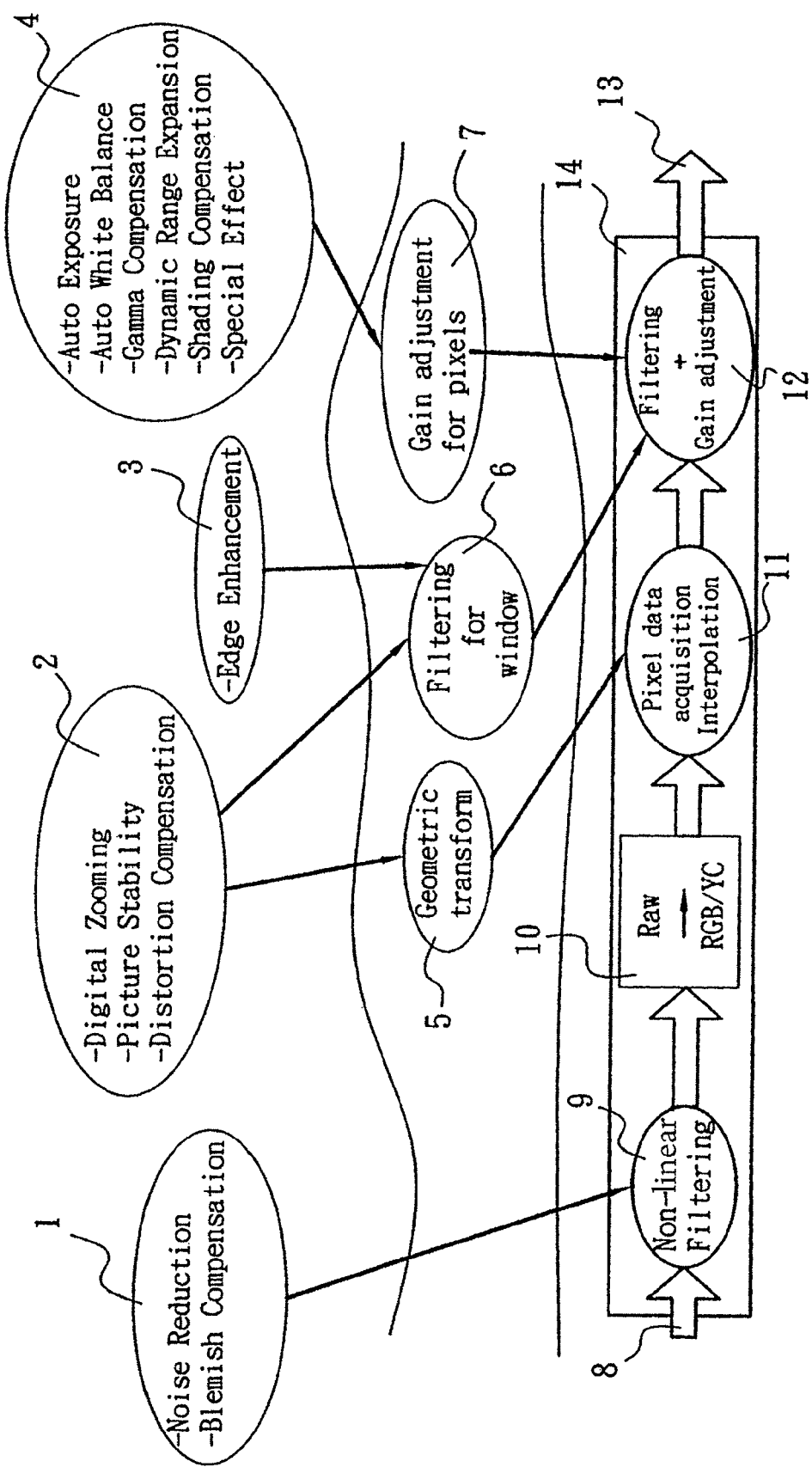
FIG. 1 is a diagram illustrating the functional classification of camera processing in accordance with an embodiment of the present invention.

The present invention relates to camera processing. The major functions of camera processing are listed below, but the present invention is not limited to the processes used in this system. This invention may be applied to all kind of camera processes.

The major functions of the camera processing are:
Blemish compensation (defect compensation)
Mosaic transformation (raw data to RGB/YcrCr)
Auto exposure
Auto white balance
Auto focus
Edge enhancement
Gamma compensation
Shading compensation
Digital zooming
Picture stabilization
Local filtering, including noise reduction
Distortion compensation
Dynamic range expansion
Special effect Each of these functions is generally executed by independent function block. All of these blocks are then worked together as to build a complete camera system. Sometime, each block is equipped with its data path and local controller. Generally, these functions are performed at a specific color space for each function; some functions are processed in the raw data space while the others are executed in RGB color space. YCbCr (YUV) may also be used as a color space of data processing.

After analyzing each of these function blocks, some of them may be merged or combined, thus make it possible to developed as an intensive function block. Particularly, a data path thereof may be merged as a common hardware while a control part and judgment portion may be realized as hybrid software for processor.

[Analysis of Processing]

The function blocks of camera system are described below. These function blocks are merely exemplifying, various methods and algorithms may be used to realize the camera system of this invention.

Blemish Compensation

The blemish (defect) pixels of an image sensor, such as CCD, CMOS image sensor, are compensated at this block. The blemish is generally a fixed defect to white value or black value regardless to the image. The blemish compensation processes raw data from the image sensor. Local filter is used to replace or suppress the blemish pixel data to shield blemish/defect. Nowadays, some system not only compensates the fixed defects with predetermined position data but also detects and compensates the defects on-the-fly without predetermined data to blemish positions.

Mosaic Transformation

Mosaic transformation relates to a color space transformation from raw data to a set of red(R), green(G), and blue(B) data or color difference signals (Cb and Cr) and a luminance signal (Y). The absent pixel data of some color components is interpolated with new data from local data to form three components color space such as RGB. With this function, the amount of data becomes three times the raw data. The raw data can be primary colors (R, G, B) or complementary colors (G, Cy, Mg). The color component after mosaic transformation can be either RGB or YCbCr.

Automatic Exposure

Automatic exposure adjusts the picture exposure by controlling the gain of amplifier blocks, iris, and shutter speed in either electrical manner or mechanical manner. In this function block, a digital value is measured according to the intensity of luminance signal and then the gain of each color component is adjusted for whole image. This function is executed on a pixel-by-pixel basis.

Automatic White Balance

Automatic white balance relates to an adjustment of color of picture in various illumination situations. After analyzing color of picture by checking color temperature, the camera system adjusts colors by adjusting the gain of each color component. Automatic white balance may be performed either in RGB color space or YCbCr color space on a pixel-by-pixel basis.

Automatic Focusing

Automatic focusing is an operation for detecting sharpness or contrast of image with the position changing of focus lens. Certain parameters related to frequencies of an image may be used to control the actuator of lens and judge the moving direction of focus. This function is merely for lens module and no signal processing is involved.

Edge Enhancement

Edge Enhancement is a digital image processing filter that is used to make pictures look sharper than they really are. This function may be performed on RGB color space or YCbCr color space.

Gamma Compensation

This function is a non-linear transformation to each color component on a pixel-by-pixel basis in either RGB color space or YCbCr cooler space.

Shading Compensation

The edges of the image may be shadowed due to the properties of the lens. This function compensates the shadowed edges by changing the amplifier's gain in accordance with the related position of pixel in the image so as to increase brightness at the dark edge of the image. This shading compensation function is performed on a pixel-by-pixel basis.

Digital Zooming

This function relates to scaling with horizontal and vertical filters to modify the picture size.

Picture Stabilization

This function relates to shifting of picture data in response to the movement of camera by performing a shifting of data and filtering for interpolation on a pixel-by-pixel basis.

Noise Reduction

This function is a local filtering, including non-linear filtering with a median filter. This function is performed on a color component basis and filtering is performed in selected window size such as 3 3, 5 5 and so on.

Distortion Compensation

This function relates to a geometrical transformation to adjust the distortion caused by lens characteristics. This function is performed to each color component with interpolating filtering.

Dynamic Range Expansion

Each pixel value is varied according to its corresponding pixel data value. Dynamic range expansion may change the gain of each pixel data on a data dependent or an area dependent basis. In order to improve the visual quality of an image, the gain on an illuminated area is decreased while that on a dark area is increased. This corresponds to the same effect expansion of dynamic range of image.

Special Effect

There are several types of special effect functions, such as negate-color, sepia color and so on. In the example below, the special effect is assumed as a process of pixel, including color change.

These functions are summarized in Table 1 by pointing out some common characteristics of each function with the items of color space, operation category of each function and data unit to be processed.

TABLE 1

| Function | Color space | Operation | Data unit |
|---|---|---|---|
| Blemish compensation | Raw | Filtering | Window |
| Mosaic transform | Raw → RGB/YC | Filtering | Window |
| Automatic exposure | RGB/YC | Gain adjustment | Pixel |
| Automatic white balance | RGB/YC | Gain adjustment | Pixel |
| Automatic focusing | RGB/YC | Lens module | — |
| Edge enhancement | RGB/YC | Filtering | Window |
| Gamma compensation | RGB/YC | Non-linear | Pixel |
| Shading compensation | RGB/YC (Raw) | Gain adjustment | Pixel |
| Digital zooming | RGB/YC | Geometric transform + filtering | Window |
| Picture stabilization | RGB/YC | Geometric Window transform + filtering | |
| Noise reduction | RGB/YC | Filtering | Window |
| Distortion compensation | RGB/YC(Raw) | Geometric Window transform + filtering | |
| Dynamic range expansion | RGB/YC | Gain adjustment | Pixel |
| Special effect | RGB/YC | Gain adjustment/ color | Pixel |

The color space refers to the color component used for each function. Theoretically, each function can be processed with any color component, i.e., raw, RGB and YCrCb, another color component is also doable. The operation refers to the category of calculation. Filtering portion local filtering in window, gain portion changing the value by multiplying a gain factor. The geometric transformation refers to generating pixel data from a specific area. The geometric transformation is followed by a filtering operation. Data unit refers to the size of data to be processed. In the operation of filtering, the data unit required to be set in a window while in the operation of gain adjustment, an individual pixel data is required for the operation.

With these factors, it is clear that the processed on camera system are divided into several categories. This category is used in example 1 below to show the example of realizing inventive system with merging the same category's operation into common operation, and common intensive hardware implementation.

In the following Table 2, two more factors are described. One factor is area-dependent process while the other is scene-dependent process. The area-dependent process refers to a process that has the capability of improving of performance with processing area dependently which is specified by picture analysis by backend processing. The scene-dependent process refers to a process that the operation thereof is performed depending on the scene taken. These two factors are used for camera processing. Since the difficulties of processing scene analysis and segmentation for area-dependent process, these two factors are not used in conventional camera system. This invention provides the possibility of using these high-level and complex processes with the aid of high performance processor in backend. Some examples of scene-dependent processes and area-dependent processes are described in the example below.

TABLE 2

| Function | Scene-dependent | Segmented area-dependent |
|---|---|---|
| Blemish compensation | ˅ | fixed |
| Mosaic transform | | fixed |
| Automatic exposure | ˅ | ˅ |
| Automatic white balance | ˅ | |
| Automatic focusing | ˅ | — |
| Edge enhancement | | ˅ |
| Gamma compensation | ˅ | |
| Shading compensation | | fixed |
| Digital zooming | | |
| Picture stabilization | | |
| Noise reduction | ˅ | ˅ |
| Distortion compensation | | fixed |
| Dynamic range expansion | ˅ | ˅ |
| Special effect | | |

Example 1

Based on the above analysis, an exemplary system of this invention is explained. A block diagram illustrating the inventive system merged with above functions is shown in FIG. 1. In FIG. 1, an example of inventive flow for a camera processor is shown. An upper portion of FIG. 1 shows the functions which should be processed at camera processor. These functions are categorized into four groups. Numeral 1 indicates the group which performs non-linear filtering and includes noise reduction and blemish compensation as an example; numeral 2 indicates a group which includes digital zooming, picture stability, distortion compensation with common operations of geometric transform and the following filtering; numeral 3 indicates a group which includes edge enhancement requiring local filtering; and numeral 4 indicates a group which includes automatic exposure, automatic white balance, gamma compensation, dynamic range expansion, shading compensation, and special effect and so on. These functions are generally operated on a pixel-by-pixel basis, sometimes, on a component basis. These functions may be alternatively operated on a color vector, but this operation is related to each pixel data without filtering. Group 1 is directly mapped onto a non-linear filtering block 9 on a lower portion of FIG. 1.

Based on the analysis of each function in Table 1, these functions are classified into several categories as shown in the middle portion of FIG. 1. These categories are geometric transform 5, filtering for window 6, and gain adjustment for pixels 7. Geometric transform category 5 extracts the operation of geometric transform part from the operations of group 2. The filtering operation of group 2 is extracted and merged onto filtering for window category 6. The filtering operations from group 3 are also extracted and merged onto filtering for window category 6. The category 7 of gain adjustment for pixel relates to an operation to each pixel data on a pixel-by-pixel basis for adjusting the pixel value by calculation, such as multiplication.

The lower portions 14 of FIG. 1 are practical function blocks which are to be implemented as hardware. Numeral 8 indicates a digital raw data output from an image sensor (not shown). The data is then delivered to the non-linear filtering block 9 for processing. Numeral 10 indicates a transformation block for converting the digital raw data from the non-linear filtering block 9 into color signal components R, G and B or further converting the R, G and B data into color-difference signals (Cb and Cr) and a luminance signal (Y). The transformation block 10 further interpolates the pixel data which is absent on the image sensor and generates RGB or YCbCr bitmap plane for the following processing. Numeral 11 indicates a geometric transformation block for geometrically transforming the RGB or YCbCr data from transformation block 10 by accessing and acquisitioning proper data and interpolating the data to be generated in the geometric transformation. Numeral 12 indicates the last block for combining the filtering category 6 and gain adjustment category 7 onto one operation and a final result 13 is output.

The key point of this invention is to categorize each camera processes into several groups and combine these categorized functions into common operations and hardware. With this combination, the inventive system is able to realize a sophisticated system with more flexibility of operations and lesser data path hardware. The clear separation between data path and control and judgment function will be explained below. The effectiveness of this inventive system is achieved by a control and judgment part which is implemented by a powerful processor.

Figure 2:
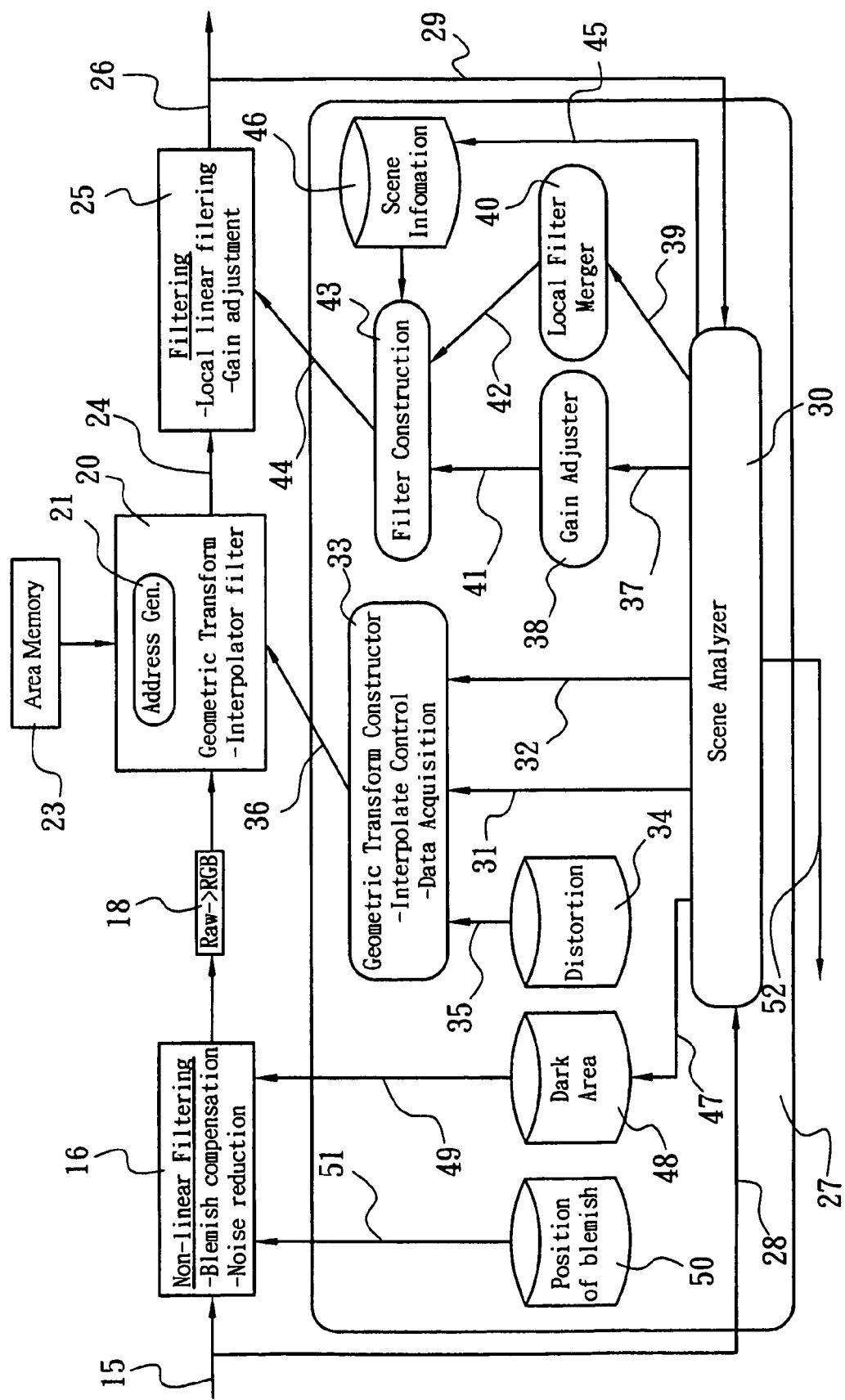
FIG. 2 is a diagram illustrating a data path portion and control and judgment portion in accordance with an embodiment of the present invention.

FIG. 2 shows an exemplary embodiment of the inventive system. An upper portion of FIG. 2 is a data path while a lower portion of FIG. 2 is a control and judgment portion which is for example implemented as software in this case. The data path configuration is the same as that of FIG. 1. The input raw data 15 is transmitted to the non-linear filtering block 16 for blemish compensation and noise reduction. An output signal from the non-linear filtering block 16 is input to the transformation block 18 to generate RGB bitmap data. The generated RGB data is delivered to the geometric transformation block 20 for intensively performing all of geometric operation. The geometric transformation block 20 requires memory, shown as area memory 23, to store pixel data for transformation process. The geometric transformation block 20 further includes an address generator 21 for generating addresses for area memory 23 to access data and an interpolation filter for generating a pixel data corresponding to the position to be transformed. An output 24 of the geometric transformation block 20 is transmitted to filtering block 25 which has a hybrid function of local filtering and gain adjustment. An output 26 from filtering block 25 is output as a resultant signal of this camera processing system.

The lower portion of FIG. 2 is the control and judgment part 27 which is generally implemented as software program on a CPU or DSP. The control and judgment part 27 has a scene analysis block 30 with functions of scene analysis and generation of parameters and control signals for the data path according to the result of scene analysis. The scene to be analyzed is either a raw data input signal 28 or an output processed video signal 29. Both signals may be used at the same time for scene analysis. After scene analysis, scene analysis block 30 generates parameter 31 and 32 for picture stability to a geometric transformation constructor 33 with function of distortion compensation. Distortion information for distortion compensation is stored in a database 34 and then sent to the geometric transformation constructor 33 through line 35 when required. The geometric transformation constructor 33 then generates final parameters and control signal 36 for geometric transformation block 21 to perform a combined geometric transformation.

The scene analysis block 30 further performs scene analysis for automatic white balance and automatic exposure and other functions. Signals related to gain adjustment are combined and sent through line 37 to a gain adjuster 38 while signals related to filtering are combined and sent through line 39 to a local filter merger 40. Outputs 41, 42 from gain adjuster 38 and local filter merger 40 are combined at filter construction block 43 to construct an intensive filtering operation output 44 for filtering block 25. As this embodiment supports scene-dependent and area-dependent operations for filtering and gain adjustment, a scene information 45 from the scene analysis block 30 is stored in a scene information database 46 for adaptively changing the operation according to the scene itself or area itself segmented by the scene analysis block 30.

Sometimes, the operations to raw data require scene information. For example, the noise reduction operation may require an area information such as dark area. A dark area information 47 is sent from scene analysis block 30 to a storage area 48 for outputting an information 49 used to process raw data such as adaptive noise reduction and so on. For blemish compensation, information 51 about the positions of blemish is required and stored in a storage 50. The information 51 is delivered to non-linear filtering block 16 for blemish compensation when required. The scene analysis block 30 further generates control signals 52 for controlling iris and focus lens and shutter speed of a lens module (not shown).

The control and judgment part 27 is implemented with a high performance processor. This processor may be integrated onto the same chip of data path. Alternatively, this processor may be incorporated into a powerful processor such as a backend processor which is mainly used for application program. When this processor is incorporated into the backend processor, the remaining chip is just for performing high speed signal processes with hardware thereby simplifying the hardware data path with flexibility. Additionally, as the implementation of high speed data path, the power consumption becomes lower in comparison with pure software implementation. This data path does not require a complicated control and judge function, thus make it easy to integrate this data path onto an image sensor chip.

Example 2

Figure 3:
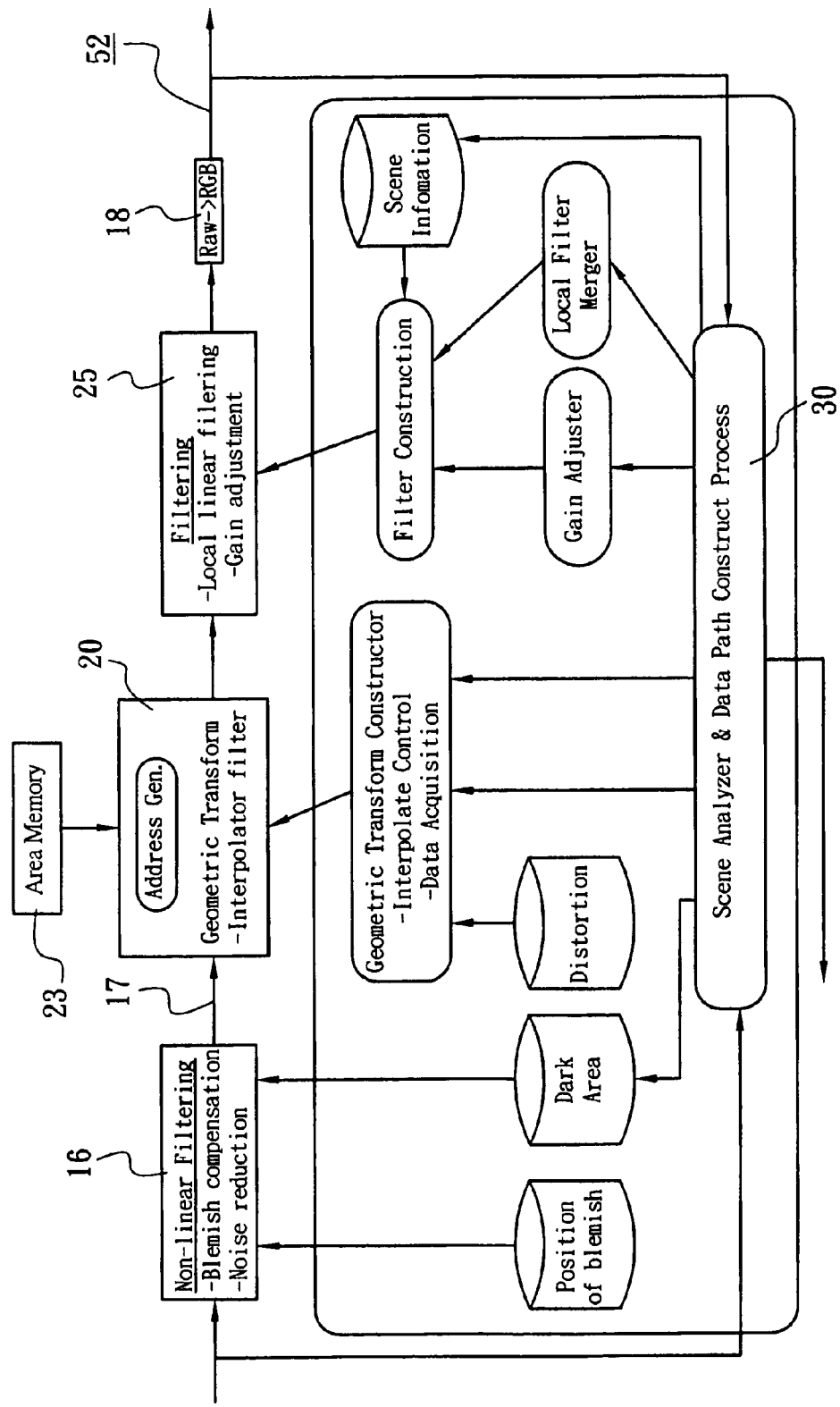
FIG. 3 is a diagram illustrating a data path portion and control and judgment portion in accordance with another embodiment of the present invention.
Figure 4:
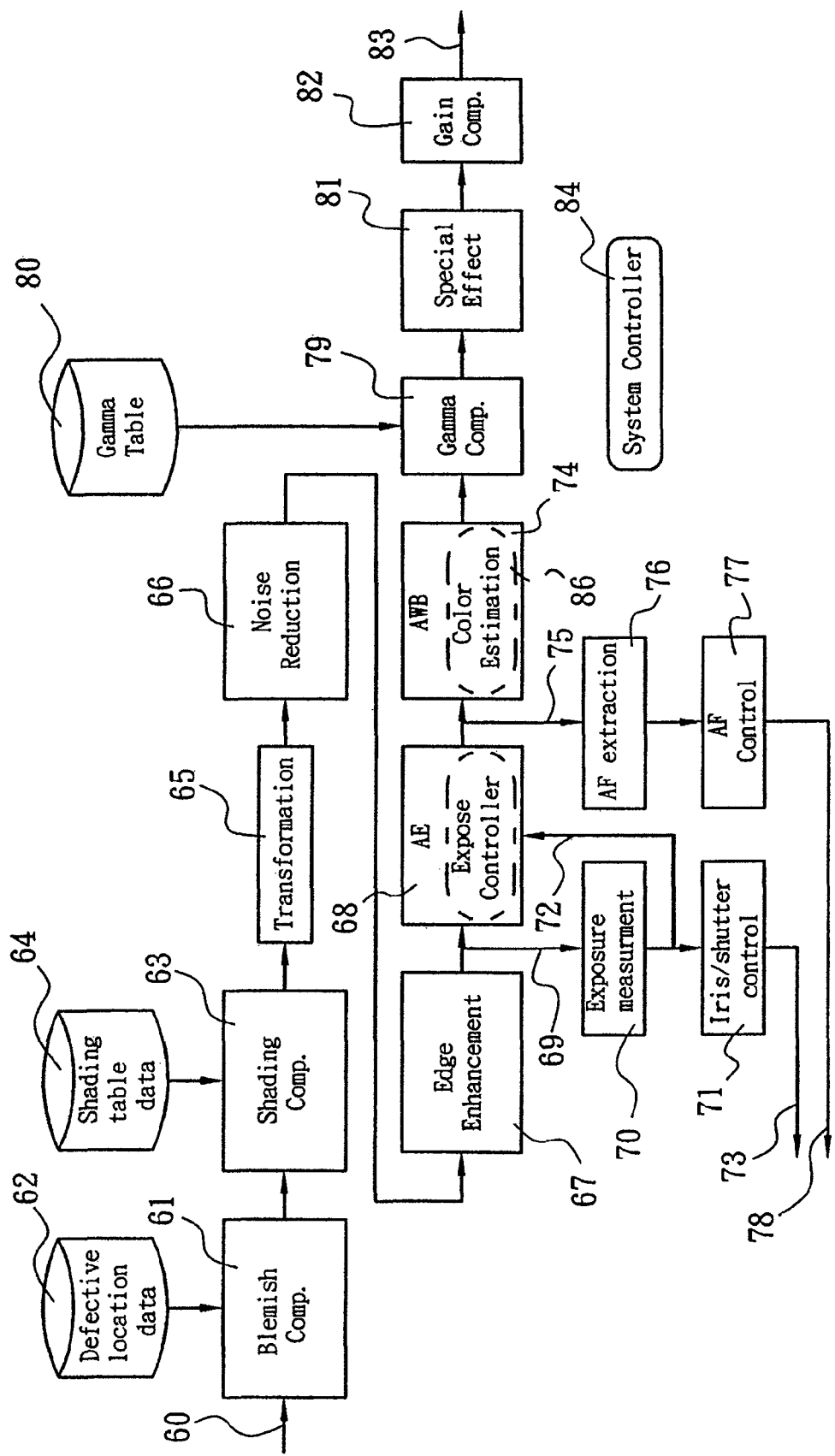
FIG. 4 is a block diagram of a conventional camera system.

FIG. 3 shows another embodiment of the image processing system of this invention. Instead of transforming color component from raw data to RGB at a early stage of camera processing in FIG. 2, this embodiment has the raw-to-RGB transformation to be done at the last stage of camera processing. In FIG. 3, geometric transformation and filtering blocks 20 and 25 process raw data instead of RGB components. The output signal 17 from non-linear filtering block 16 is delivered to geometric transformation block 20 directly and transformation block 18 delivers an output signal 52 as an output of this image processing system. All of these operations are done for raw data output from image sensor. The other blocks and connections of this embodiment are almost the same as FIG. 2 except the transformation of parameters and control signals among scene analysis block 30, geometric transformation block 20 and filtering block 25. Usually, such transformation is done by additional software subroutine in the filtering block 25.

When raw data is transformed to RGB data, the data amount thereof will increase, for example three times from original raw data. When raw data is processed, the data amount to be processed is substantially reduced and the power required for processing is reduced.

This invention provides a sophisticated architecture for a camera system by employing a flexible configuration, an intensive data path merged common operations onto a block, and a separated control and judgment part outside of the data path. Due to this flexible configuration, it is possible to allow a system designer to update and change the algorithm after building the system. The data path is adaptable to various operations. In addition, the outside processor may realize versatile control and judge algorithm. With a powerful processor, the complicated scene analysis and classification algorithm can be realized according to the system requirement.

Additionally, as the data path is operated under high frequency with hardware blocks, the power taken by the data path is reduced in comparison with pure software implementation. However, the inventive system possesses a flexibility which is almost the same as the pure software implementation.

This invention provides an intelligent imaging system for future visual application such as robot vision.

What is claimed is:

1. An image signal processing apparatus, comprising:
a data path portion for processing a raw image signal,
wherein said data path portion is merged and concentrated with non-linear filtering portion, color space transformation portion, geometry transformation portion, linear filtering portion and gain adjustment portion,
wherein outputs from said gain adjustment portion and a local filter merger are combined at a filter construction portion to construct an intensive filtering operation output for said linear filtering portion; and
a separated control and judgment portion outside of said data path portion for receiving the raw image and the processed signal from said data path portion and generating a plurality of adjustment signals for the non-linear filtering portion, color space transformation portion, geometry transformation portion, linear filtering portion and gain adjustment portion of said data path portion,
wherein the separated control and judgment portion comprises a scene analysis portion for performing scene analysis,
wherein the scene analysis portion supports area-dependent and scene-dependent operations for filtering and for gain adjustment,
wherein an operation of the scene analysis portion is adaptively changed according a scene or an area segmented by the scene analysis block,
wherein, when the adaptively changed operation requires predetermined data, the scene analysis portion sends control signals to the control part and sends raw data to a storage unit for outputting an information used to process the raw data;
wherein the data path portion is adaptable to a plurality of operations and the data path portion and the separated control and judgment portions are configured to be changed to update an algorithm.

2. The image signal processing apparatus according to claim 1, wherein:
said non-linear filtering portion performs the functions of noise reduction and blemish compensation;
said color space transformation portion receives the signal from said non-linear filtering portion and transforms said image signal data into color space data;
said geometry transformation portion performs the functions of distortion compensation and shifting of image;
said linear filtering portion performs the function of edge enhancement; and
said gain adjusting portion performs the functions of automatic exposure control, automatic white balance control, and gamma compensation.

3. The image signal processing apparatus according to claim 2, wherein said color space data is of red, green and blue (RGB) color space signals.

4. The image signal processing apparatus according to claim 2, wherein said color space data is of YCrCb color space data.

5. The image signal processing apparatus according to claim 1, wherein said control and judgment portion includes a control routine for scene analysis and data path construction, comprising:
scene analysis portion for extracting scene characteristic and parameters and outputting a control signal to a lens module for controlling iris, focus lens and shutter speed;
data path constructing portion for calculating the parameters and signals for constructing data path;
geometry transformation constructing portion for generating one of said adjusting signal for said geometry transformation portion for constructing the geometry transformation portion in said data path portion; and
gain adjusting portion and local filtering portion connected to a filter configuration portion for generating one of said plurality of adjusting signals to said local filtering portion and gain adjusting portion.

6. The image signal processing apparatus according to claim 5, wherein said control routine further comprises:
dark area information storage portion for providing a dark area information adjusting signal to said non-linear filtering portion; and
defect location storage portion for providing a defect location adjusting signal to said non-linear filtering portion.

7. The image signal processing apparatus according to claim 1, wherein said data path portion and said control and judgment portion are integrated on a common semiconductor chip.

* * * * *